United States Patent
Singh (10) Patent No.: US 12,169,577 B2
(45) Date of Patent: Dec. 17, 2024

(54) SECURELY EXECUTING CLIENT CODE IN A SHARED INFRASTRUCTURE

(71) Applicant: Salesforce, Inc., San Francisco, CA (US)

(72) Inventor: Prabhjot Singh, Union City, CA (US)

(73) Assignee: Salesforce, Inc., San Francisco, CA (US)

( * ) Notice: Subject to any disclaimer, the term of this patent is extended or adjusted under 35 U.S.C. 154(b) by 238 days.

(21) Appl. No.: 17/974,371

(22) Filed: Oct. 26, 2022

(65) Prior Publication Data

US 2024/0143807 A1 May 2, 2024

(51) Int. Cl.
*G06F 21/62* (2013.01)

(52) U.S. Cl.
CPC .............................. *G06F 21/6218* (2013.01)

(58) Field of Classification Search
CPC .................................................. G06F 21/6218
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |

(Continued)

*Primary Examiner* — Jimmy H Tran
(74) *Attorney, Agent, or Firm* — Kwan & Olynick LLP (57) ABSTRACT

Execution of client code in a shared infrastructure comprises instantiating a container manager to manage containers and routers configured to receive calls requesting execution of the client code. The container manager pre-initializes a plurality of containers and registered the containers in a database to indicate that the plurality of containers are available. A router receives a call to execute the client code and selects an available first container identified in the database. The call is routed to the selected container and the status of the container is updated to in-use to prevent another router from selecting the container. Responsive to the selected container processing the call, the router receives a response from the container and returns the response to the caller. The containers then marked for deletion in the database. The container manager then deletes any of the containers marked for deletion to prevent the containers from processing subsequent calls.

20 Claims, 4 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,613,901 B1 * | 4/2020 | Mehr ................. G06F 9/45533 |
| 10,616,230 B2 | 4/2020 | Singh et al. |
| 10,616,352 B2 | 4/2020 | Elangovan et al. |
| 10,971,159 B2 | 4/2021 | Singh |
| 11,405,183 B2 | 8/2022 | Singh et al. |
| 11,487,753 B1 | 11/2022 | Singh et al. |
| 11,907,731 B1 * | 2/2024 | Resios ................ G06F 9/44505 |
| 12,058,012 B1 * | 8/2024 | Viklund ................. H04L 67/10 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |

(56) References Cited

U.S. PATENT DOCUMENTS

| | | |
|---|---|---|
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0233668 A1* | 9/2012 | Leafe .................. G06F 9/44526 726/4 |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0040979 A1* | 2/2014 | Barton .................. H04W 12/30 726/1 |
| 2014/0359537 A1 | 12/2014 | Jackobson et al. |
| 2014/0373109 A1* | 12/2014 | McGrath ................. G06F 9/455 726/4 |
| 2015/0268881 A1* | 9/2015 | Nielsen .................. G06F 3/065 711/114 |
| 2016/0150053 A1* | 5/2016 | Janczuk .................. G06F 8/433 709/217 |
| 2016/0162320 A1* | 6/2016 | Singh .................... G06F 9/5077 718/1 |
| 2017/0140158 A1* | 5/2017 | Gounares ................ H04L 67/14 |
| 2017/0223117 A1* | 8/2017 | Messerli ............... H04L 47/783 |
| 2017/0228391 A1 | 8/2017 | Savla et al. |
| 2017/0366551 A1* | 12/2017 | Brandwine ............. H04L 47/70 |
| 2018/0287883 A1* | 10/2018 | Joshi ...................... G06F 9/455 |
| 2019/0102206 A1* | 4/2019 | Fichtenholtz ......... G06F 9/5027 |
| 2019/0108116 A1* | 4/2019 | Benes ................... G06F 21/552 |
| 2019/0155938 A1 | 5/2019 | Kudriavtsev et al. |
| 2020/0034543 A1* | 1/2020 | Gupta ................. G06F 9/44505 |
| 2020/0036599 A1* | 1/2020 | Savov ..................... H04L 41/22 |
| 2020/0053089 A1 | 2/2020 | Singh |
| 2020/0153719 A1* | 5/2020 | Chauhan ................. H04L 67/02 |
| 2020/0285652 A1* | 9/2020 | Wang ...................... H04L 67/10 |
| 2020/0356980 A1 | 11/2020 | Singh et al. |
| 2020/0356998 A1 | 11/2020 | Singh et al. |
| 2020/0389416 A1* | 12/2020 | Sharifi Mehr .......... H04L 41/40 |
| 2021/0124842 A1* | 4/2021 | Raju ..................... G06F 40/166 |
| 2021/0232415 A1* | 7/2021 | Wagner ................... H04L 67/10 |
| 2021/0233045 A1 | 7/2021 | Singh et al. |
| 2021/0263779 A1* | 8/2021 | Haghighat ............ G06F 9/5061 |
| 2021/0288943 A1* | 9/2021 | Green ................. G06F 21/6218 |
| 2021/0357238 A1* | 11/2021 | Kirmse ................ G06F 9/45558 |
| 2021/0409345 A1* | 12/2021 | Elmenshawy .......... G06F 21/44 |
| 2022/0012045 A1* | 1/2022 | Rudraraju ................. G06F 8/36 |
| 2022/0038453 A1* | 2/2022 | Chauhan ............. H04L 63/0853 |
| 2022/0131851 A1 | 4/2022 | Singh |
| 2022/0286292 A1 | 9/2022 | Kannan et al. |
| 2022/0391215 A1* | 12/2022 | Bregman ............ G06F 9/45558 |
| 2022/0391492 A1* | 12/2022 | Baker .................. G06F 21/629 |
| 2022/0391748 A1* | 12/2022 | Nikitin ................. H04L 67/133 |
| 2023/0093925 A1* | 3/2023 | Liguori ................. G06F 9/5077 718/1 |
| 2023/0164272 A1* | 5/2023 | DiMaria ............. H04M 3/5231 713/193 |
| 2024/0080277 A1* | 3/2024 | Lee ....................... H04L 47/803 |

* cited by examiner

SECURELY EXECUTING CLIENT CODE IN A SHARED INFRASTRUCTURE

TECHNICAL FIELD

One or more implementations relate to security in the field of software applications; and more specifically, to securely executing client code in a shared infrastructure.

BACKGROUND ART

Containerization is operating system-level virtualization or application-level virtualization over multiple network resources that enable software applications to run in isolated user spaces, called containers, in any cloud or non-cloud environment. Containerization includes an image, which is a lightweight, standalone, executable package of software that includes everything needed to run an application (code, runtime, system tools, system libraries and settings), and containers are executable instances of the image. An application may run using a cluster of containers, which are self-isolated from one another and from host machine on which the containers are executed. One popular container platform is Docker (and Kubernetes), where Docker is a container runtime, and Kubernetes is a platform for running and managing containers from many container runtimes.

Recently, containerization technology has become widely adopted in shared infrastructure cloud platforms, such as Amazon Web Services (AWS)™. Shared infrastructure cloud platforms typically provide an application programming interface (API) through which clients can interact with the platform. The API also enables the clients to run any code written in a particular type of language, e.g., Java. Clients of the cloud platform may compile their own code (e.g., node.js) for execution by containers provided by the cloud platform. For example, AWS Lambda is a serverless, event-driven compute service that enables clients to run code for virtually any type of application or backend service without provisioning or managing servers.

Most of the time, execution of client code through containers on a given machine of the cloud platform is secure, but in some instances it can become a security issue. The security issue arises because services like Lambda may use the very same machine again for subsequent calls. This is a problem because it exposes the data of one customer to another customer. As an example, assume client 1 executes code in a container on a machine that saves data to a hard drive of the cloud platform. Before client 1 can execute a delete operation on the container, assume the same machine is used to execute a container for client 2's code, thus gaining access to any data remaining in the storage space, such as client 1's data, which is a security problem.

There is a need therefore, for improved methods and systems for securely executing client code in a shared infrastructure utilizing containers.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 3 is a flow diagram showing further details of a process for implementing self-healing build pipelines for the application build process across distributed computer platforms according to one implementation.

DETAILED DESCRIPTION

The following description describes implementations for securely executing client code in a shared infrastructure utilizing containers. The disclosed implementations provide a mechanism that runs client code on a shared infrastructure, but not in the system environment context so that that any data left over is inaccessible by another client. As clients can write any code, including trying to access system files, it is mandated to run one customer request per container instance and kill the instance afterwards so that no two customer calls can land on some instance at any point in time. The disclosed implementations provide a system for enabling this capability with performance.

Figure 1:
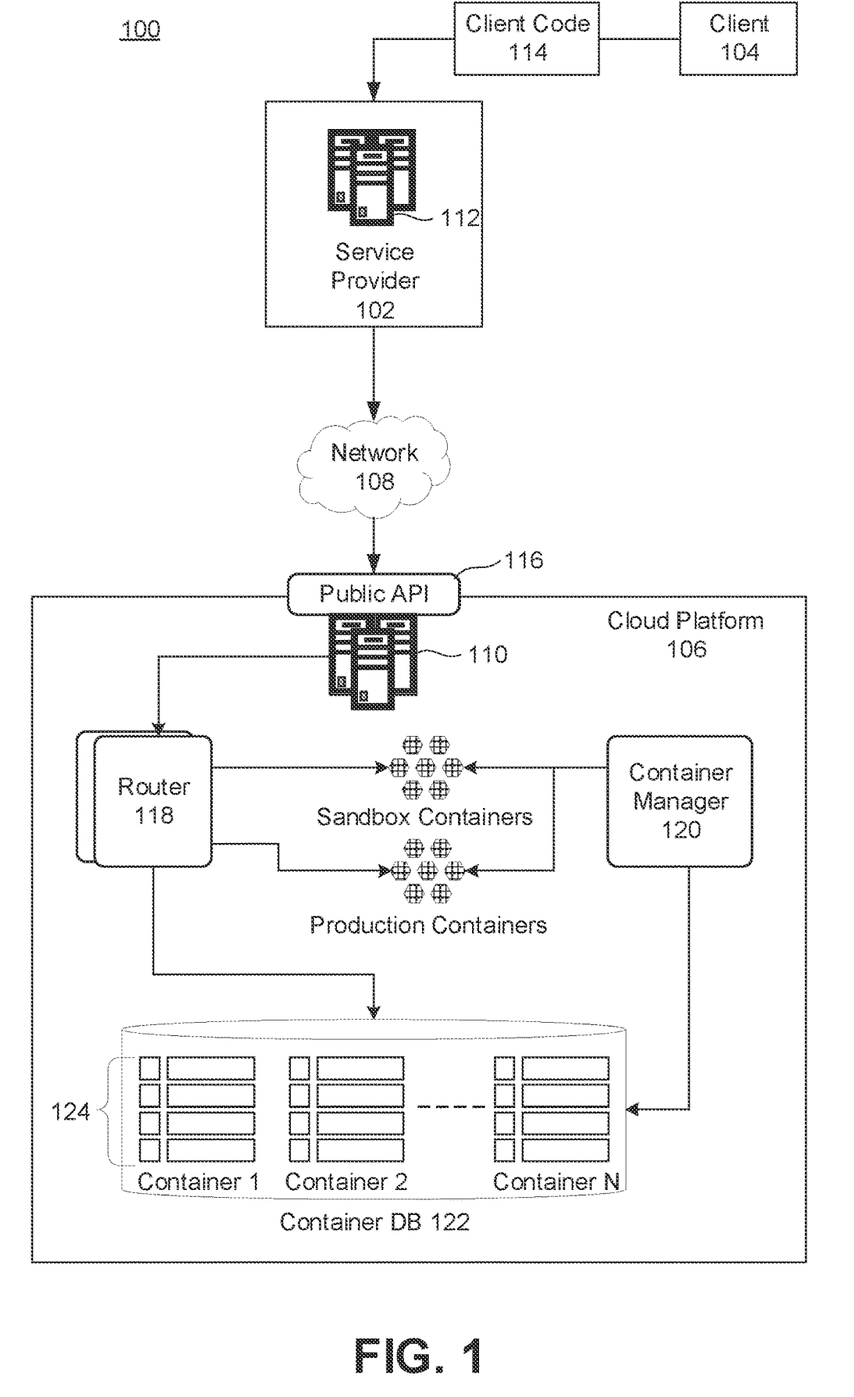
FIG. 1 illustrates a system for securely executing client code in a shared infrastructure utilizing containers.

FIG. 1 illustrates a system for securely executing client code in a shared infrastructure utilizing containers. The system 100 comprises a service provider 102 that services one or more clients 104, and a cloud platform 106 in communication with service provider 102 over a network 108. The network 108 comprises one or more arrangements of the type known in the art, e.g., local area networks (LANs), wide area networks (WANs), metropolitan area networks (MANs), and or Internet(s).

The service provider 102 may represent any entity that provides online software services to client 104 through compute resources 112. In one example implementation, the service provider 102 may provide customer relationship management (CRM) services that enable client 104 to manage the client's relationships and interactions with its customers. Additionally or alternatively, the service provider 102 may be implemented a software-as-a-service (SAAS), a platform-as-a-service (PAAS), or an infrastructure-as-a-service (IAAS). The service provider 102 may access the cloud platform 106 to provide utilize additional compute resources 110, such as servers, databases, storage, analytics, networking, software and intelligence from the cloud platform 106.

The cloud platform 106 may be implemented as an Internet-based data center comprising software and hardware (e.g., servers) that co-exist at scale. The cloud platform 106 may be provided by a third-party cloud service provider that delivers computing resources over the Internet. Example cloud service providers include Amazon Web Services (AWS)™, Microsoft Azure™ and Google Cloud Platform (GCP), and IBM Bluemix™. The cloud platform 106 may provide scalable computing capacity in the form of virtual private clouds (VPCs) in which service provider 102 can launch as many or as few servers as they need, configure security and networking, and manage storage. Virtual private clouds (VPCs), may include various configurations of CPU, memory, storage, and networking capacity for each entity's instances. An example of such an environment is Amazon Elastic Compute Cloud™ (Amazon EC2), which provides scalable computing capacity in the AWS cloud.

To leverage the global infrastructure provided by cloud platform 106, the service provider 102 may move software services from in-house systems to the cloud platform 106. Some of the services provided by service provider 102 may enable client 104 to write client code 114 in any language and send an electronic request or call to the service provider 102 to execute the client code 114. As an example, the client code 114 might represent an executable network application that is to be executed in a back-end JavaScript runtime environment, such as node.js, which runs on a JavaScript Engine. Typically, the client request is forwarded via a public API 116 to the cloud platform 106 for execution within a container instance. In some implementations, either the client 104 or the service provider 102 may compile the client code 114.

One challenge is that the service provider 102 allows the client 104 to run code, such as nodes of Python and Java, which are powerful languages that are not controlled by the cloud platform 106. The code can be written to perform virtual any function, including trying to access core or system files. The problem of running the client code 114 on containers such as Dockers or Lambda is that the containers may reuse the same machine to process subsequent calls. This is a problem because reusing the same machine executing the containers may exposes the data of one client to another client.

According to the disclosed implementations, the system 100 comprises an architecture within the cloud platform 106 along with selected options that enable the shared infrastructure of the cloud platform 106 to securely execute the client code 114 using containers. Once any given container executes the client code 114 once, the container is deleted/terminated so that next time any client code is executed, the code is executed by a different container in a different environment or on a different machine.

This is accomplished through use of an architecture comprising at least one router 118, a container manager 120, and a container database 122 comprising a plurality of container instances 124. In one implementation, the components reside and run within the cloud platform 106. Additionally or alternatively, the components may reside at run within the service provider 102. In operation, the container manager 120 creates a container cluster of pre-warmed container instances 124 (referred to hereinafter as containers 124), and registers the containers 124 in the container database 22. Pre-warming refers to initiating and executing the containers so that the containers are ready to accept requests. The router(s) 118 are configured to receive calls requesting execution of the client code 114 from the service provider 102 via the public API 116, and then 118 route each the calls to one of the pre-warmed containers 124 in the container database 122. Once the selected container 124 processes the request and returns a response to the router 118 for forwarding to the service provider 102, the container manager 120 deletes the container 124 to prevent the container from processing any subsequent calls.

The disclosed implementations mandate by security to run one client request per container instance and terminate the container instance afterwards. This ensures that the same machine will not process two client calls at any point in time. Conventional cloud platform services, such as AWS Lambda, may provide the capability to run code in any language, but the services reuse the Lambda for calls across various clients, and Lambda cannot be killed and re-spawned after each call to provide anonymity and security. Heroku provides one-off Dynos, which are lightweight Linux containers dedicated to running client application processes. However, the Heroku infrastructure is limited to processing only 800 parallel requests.

Further details of a system for securely executing client code within the shared infrastructure cloud platform will now be described. The public API 160 is configured to receive calls from the service provider 102 requesting the execution of client code 114, and to return results of the calls to the service provider 102 (who may then relay the results to client 104).

The container manager 120 is configured to perform the following functions. During the process of initiating a container 124, the container manager 120 registers the container 124 in the container database 122 and sets a status of the container 124 as available in the container database 122. The container manager 120 periodically deletes/terminates the containers 124 that are marked for deletion or that are in-use for more than a maximum query timeout period, e.g., 15 min. In some implementations, the container manager 120 may optionally initiate both sandbox/test type containers and production type containers, where the sandbox is a testing environment that isolates untested or experimental code from the production environment of the cloud platform.

The plurality of routers 118 may be configured to route calls requesting execution of client code 114 to one of the containers 124 in the cluster whose status is marked as available. The router 118 processes the call by first selecting one of the available containers 124, and updating the status selected container 124 as "in-use" with timestamp to implement a pre-configured strong consistency option. The strong consistency option of marking the container as "in-use" ensures that another router does not select any container 124 that is already in use. Responsive to the selected container processing the call executing the client code, the router receives a response from the selected container and returns the response to the service provider. The router then marks the selected container for deletion in the database.

The containers 124 represent the actual instance that performs the business logic of the client code 114. The containers 124 may be configured to perform the following functions. When a container 124 is initiated and comes up, the container 124 registers itself with the container manager 120 in order to be listed in the container database 122. When the container 124 receives a call from the router 118, the container 124 updates an in-memory variable indicating that the container has received the call. In one implementation, the variable may comprise an in-memory singleton thread-safe variable. The container 124 also executes the actual business logic of the client code 114. After executing the business logic, the container 124 returns a response to the request to the client 104 through the router 118, the public API 116, and the service provider 102. The router 118 then marks the container 124 in the container database 122 for termination/deletion.

Figure 2:
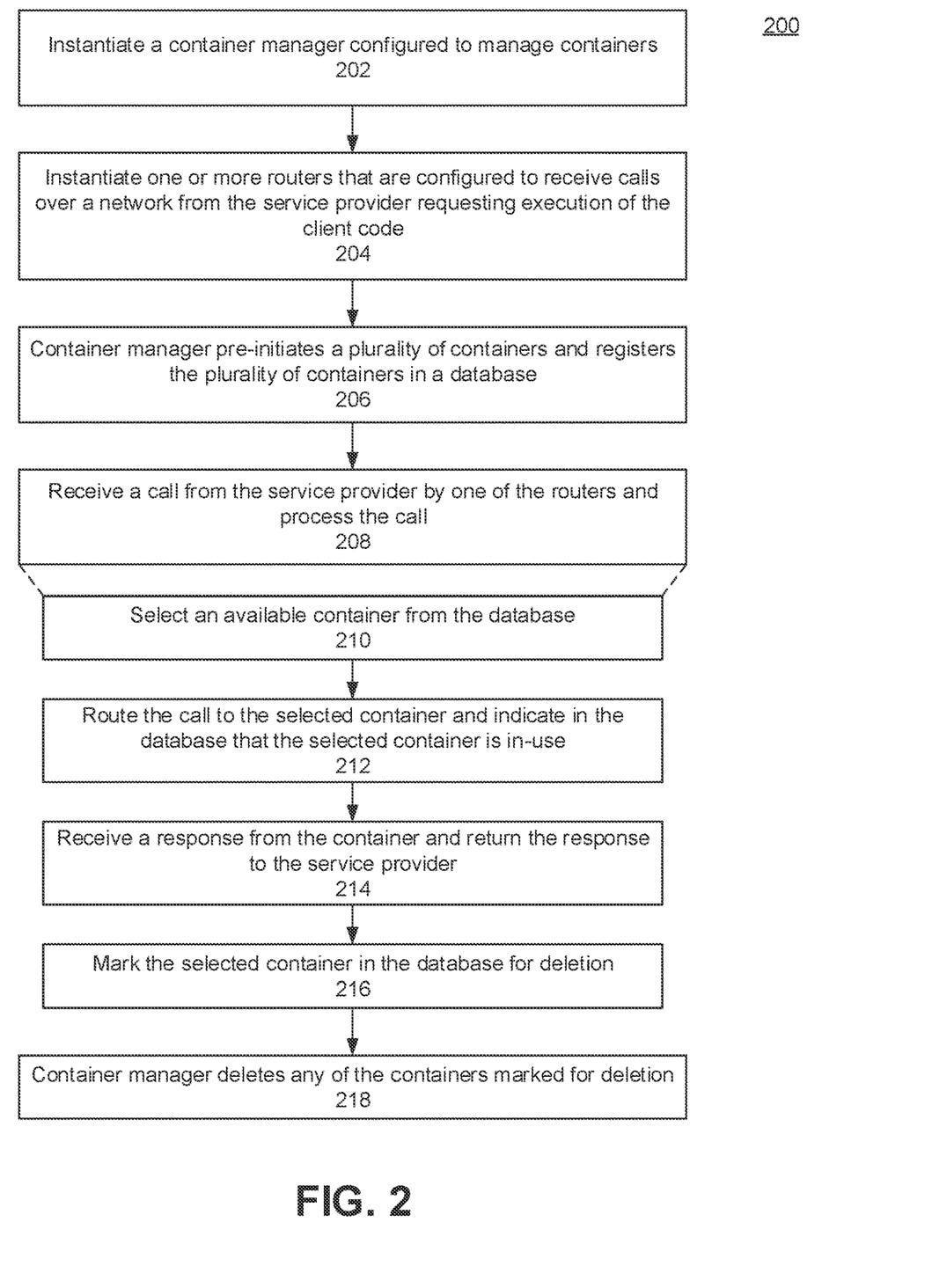
FIG. 2 is a flow diagram of a process for enabling a service provider to securely execute client code within a shared infrastructure according to one implementation.

FIG. 2 is a flow diagram of a process for enabling the service provider 102 to securely execute client code within a shared infrastructure according to one implementation. The process may be performed on compute resources 110 of the cloud platform 106. Additionally or alternatively, the process may be performed on the compute resources 112 of the service provider 102 given the service provider may also implement a shared infrastructure.

Referring to both FIGS. 1 and 2, the process 200 may include instantiating a container manager 120 configured to manage containers 124 (block 202). One or more routers 118 are instantiated that are configured to receive calls over the network from the service provider 102 that request execution of the client code 114 (block 204).

Prior to the routers 118 receiving any of the calls, the container manager 120 pre-initiates a plurality of containers instances 124 and registers the plurality of container instances (i.e., containers 124) in a database to indicate that the plurality of containers are available to handle execution requests (block 206). The container manager 120 can mark containers as available by setting a status or availability flag associated with each of the containers.

Because spinning up a container at runtime can take about 4 to 5 seconds, the disclosed implementations increase performance of the system's response to client calls by configuring the container manager 120 to start or initiate some number of containers beforehand and keeping them warm. A minimum number containers (e.g., approximately 500) are pre-initiated and kept warm. Keeping the containers warm means that the containers are initiated, executing, and ready to accept requests. Once the container manager 120 initiates a container, the container manager 120 registers the container with the database, e.g., container database 122, by setting a status of the container 124 as available. In another implementation, the container may register itself in the database. Each container may be stored in the database with a host ID, an IP address, and the availability flag. In one example implementation, where the cloud platform is AWS, the container database 122 may comprise an AWS DynamoDB-noSQL database.

A call from the service provider 102 made to the public API 116 may be received by one of the plurality of routers 118, and the router processes the call (block 208). Processing of the call comprises blocks 210-216.

To process the call, the router first selects an available container identified in the database (block 210). The router routes the call to the selected container and indicates in the database that the selected container is in-use to prevent another router from attempting to select the selected container (block 212). The router marks the selected container is in-use with a timestamp to implement a strong consistency option. Strong consistency refers to the fact that the system is distributed and may have replica routers 118, each attempting to access the same container database 122. Because of the strong consistency on the database, the routers 118 are prevented from accessing the same container 124 because the database now allows only one of the routers 118 to write a timestamp to the database for any particular container at any point in time. If a second router attempts to select the very same container, the system will throw an error and the second router is forced to select another available container from the database. The router may use the status or availability flag to mark the selected container as in-use. The router may forward the call to the selected container using the IP address associated with the container in the database.

Responsive to the selected container processing the call, the router receives a response from the selected container and returns the response to the service provider (block 214). The router then marks the selected container in the database for deletion (block 216).

The container manager 120 may periodically access the database and delete/terminate any of the plurality of containers that are marked for deletion to prevent the containers from processing any subsequent calls (block 218). In one implementation, the router may update the status or availability flag to indicate the container is to be deleted/terminated.

According to the disclosed implementations, the system 100 is configurable to provide container pre-warming capability as well as on demand scaling capabilities. This significantly improves the performance of handling client request to execute client code 114. As system 100 can be segregated between Sandbox/Test and Production container types, the system provides clients 104 the ability to select container instance types based upon budget. Further, the system 100 includes two levels of security to ensure that one and only request is served by one container. The first level security is performed by the routers 118 during container selection by marking a selected container as "in-use" to ensure that a given container can be selected by only of the routers 118 at a time. The second level security, explained below, is the containers updating an in-memory variable to indicate that the respective container has received the call from the router 118. Due to the router and container manager architecture, the system is scalable to tens of thousands of parallel requests without any performance degradation.

Figure 3:
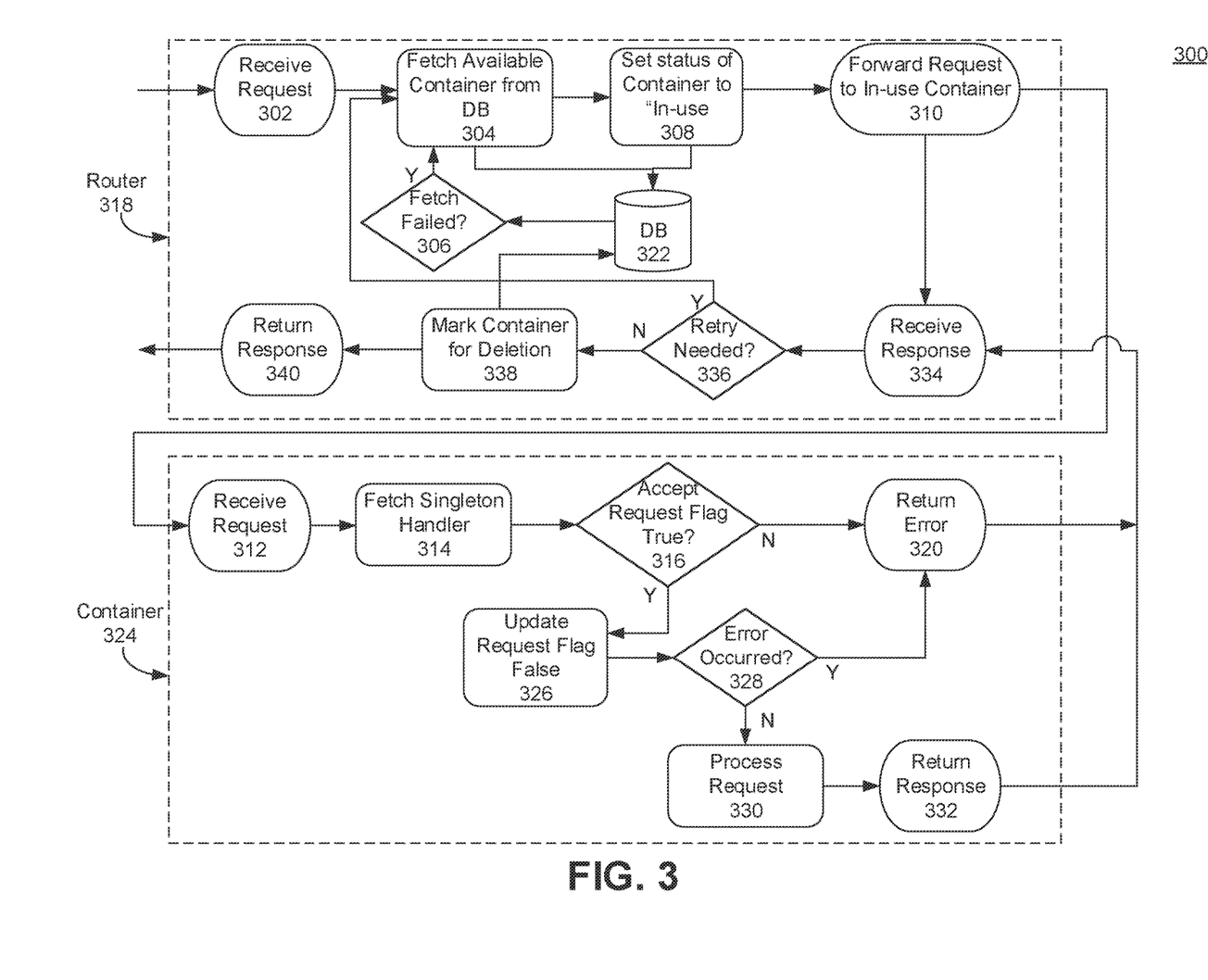
FIG. 3 is a flow diagram showing further details of processing a client request using a router and container, according to one implementation.

FIG. 3 is a flow diagram showing further details of the router and container processing a client request according to one implementation. The process 300 begins with the router 318 receiving a request through a call from the service provider (block 302). If the system includes different types of requests, the router may need to determine if the call is a plug-in request indicating that the client 104 is executing custom code that requires a secure environment to execute. In another implementation, either the cloud platform 106 or the service provider 102 may determine the type of call. A call comprising a plug-in request may require the client 104 to place a compile flag or indicator in the header of the call to indicate that the client code 114 must be executed and/or compiled. If the call is not a plug-in request, a different system handles the requests.

In response determining the call is plug-in request, the router 318 attempts to fetch an available container from the database 322 (block 304). This includes searching for and fetching from the database 322 a container 324 having a status or availability flag indicating that the container is "available". The router then fetches the selected container 324 with the associated host ID, IP address, and availability flag. If the fetch returns a fail (block 306), the process returns to block 304.

When selecting the available container 324, the router 318 sets a status or availability flag of the container 324 in the database 322 to indicate that selected container is in-use (block 308). The router 318 marking the selected container as in-use with a timestamp implements a strong consistency option and is a first level of security.

The router forwards the call to the selected "in-use" container (block 310), and the router then waits for the container to return a response in block 334.

In block 312, the container 324 receives the request from the router 318. The container 324 then fetches a singleton handler to check a singleton variable (block 314). In Java, a singleton is a design pattern that ensures that a class can only have one object. Whenever a Java function is called, an object is used that accesses the business logic. The singleton variable ensures that there can be only one object. As part of the singleton variable creation, there is a check of an accept request flag that indicates whether the container 324 should accept the request or not (block 316). This is an in memory flag so its implementation does not affect performance and is very fast. If the accept request flag is true, then the accept request flag is updated to false (block 326). If by mistake or some system failure, the same request is forwarded to the same container 324, the flag will be false, and the duplicate request will be rejected and the container 324 returns an error (block 320). Use of the singleton variable implements the second level security.

If an error occurs while updating the accept flag (block 328), the container 324 returns an error (block 320). The returned error is received by the router (block 334) and signals the router 318 that a retry is needed (block 336), and the router fetches another available container (block 304). If no error occurs while updating the accept flag (block 328), the container 324 processes the request (block 330). The container then returns a successful response to the router 318 (block 332).

The router 318 receives the successful response (block 334) and since no retry is needed (block 336), the router 318 marks the container for deletion in the database 322 (block 338). The router 318 then forwards the response back to the caller (e.g., the service provider for forwarding to the client).

Referring again to FIG. 1, the container manager 120 (or another system) wakes up on regular intervals (e.g., every minute) and deletes the containers marked for deletion. In one implementation, this may be implemented as a single thread. In another implementation, the containers marked for deletion could be deleted immediately with an asynchronous command, but deletion takes time and batch deleting improves performance. In another implementation, each of the routers 118 could perform the container deletions. But to do so requires granting privileges to the routers because the routers are only configured to read/write to the container database 122, and granting enhanced capability to all the routers 118 may decrease security. Consequently, only the specific router that fetches a given container from the database can mark that particular container for deletion.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
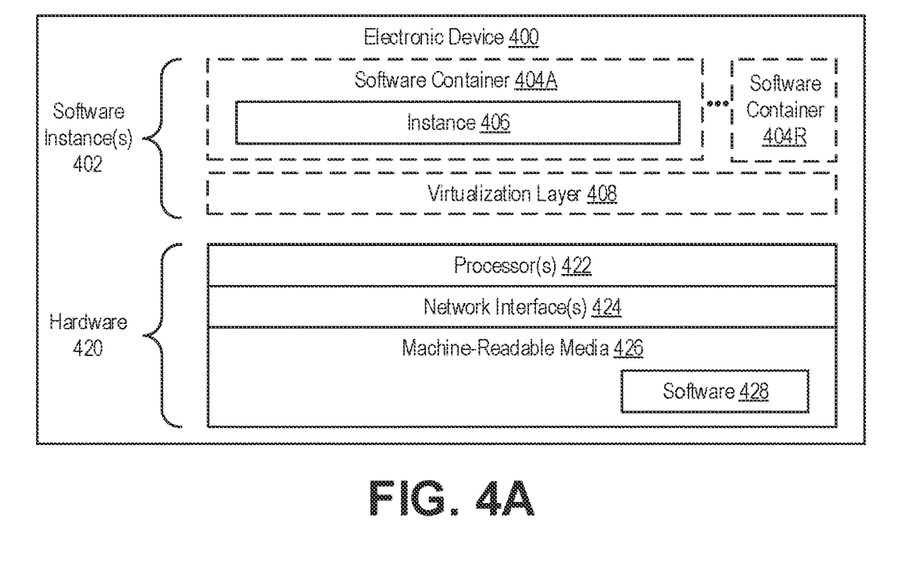
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Each of the previously described clients and the system for securely executing client code in a shared infrastructure may be implemented in one or more electronic devices 400. In one implementation: 1) each of the clients is implemented in a separate one of the electronic devices 400 (e.g., in end user devices where the software 428 represents the software to implement clients to interface directly and/or indirectly with the system for securely executing client code in a shared infrastructure (e.g., software 428 represents a web browser, a native client, a portal, a command-line interface, and/or an application programming interface (API) based upon protocols such as Simple Object Access Protocol (SOAP), Representational State Transfer (REST), etc.)); 2) the system for securely executing client code in a shared infrastructure is implemented in a separate set of one or more of the electronic devices 400 (e.g., a set of one or more server devices where the software 428 represents the software to implement the system for securely executing client code in a shared infrastructure); and 3) in operation, the electronic devices implementing the clients and the system for securely executing client code in a shared infrastructure would be communicatively coupled (e.g., by a network) and would establish between them (or through one or more other layers and/or or other services) connections for submitting configuration data to the system for securely executing client code in a shared infrastructure and returning a software package to the clients. Other configurations of electronic devices may be used in other implementations (e.g., an implementation in which the client and the system for securely executing client code in a shared infrastructure are implemented on a single one of electronic device 400).

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Example Environment

Figure 4B:
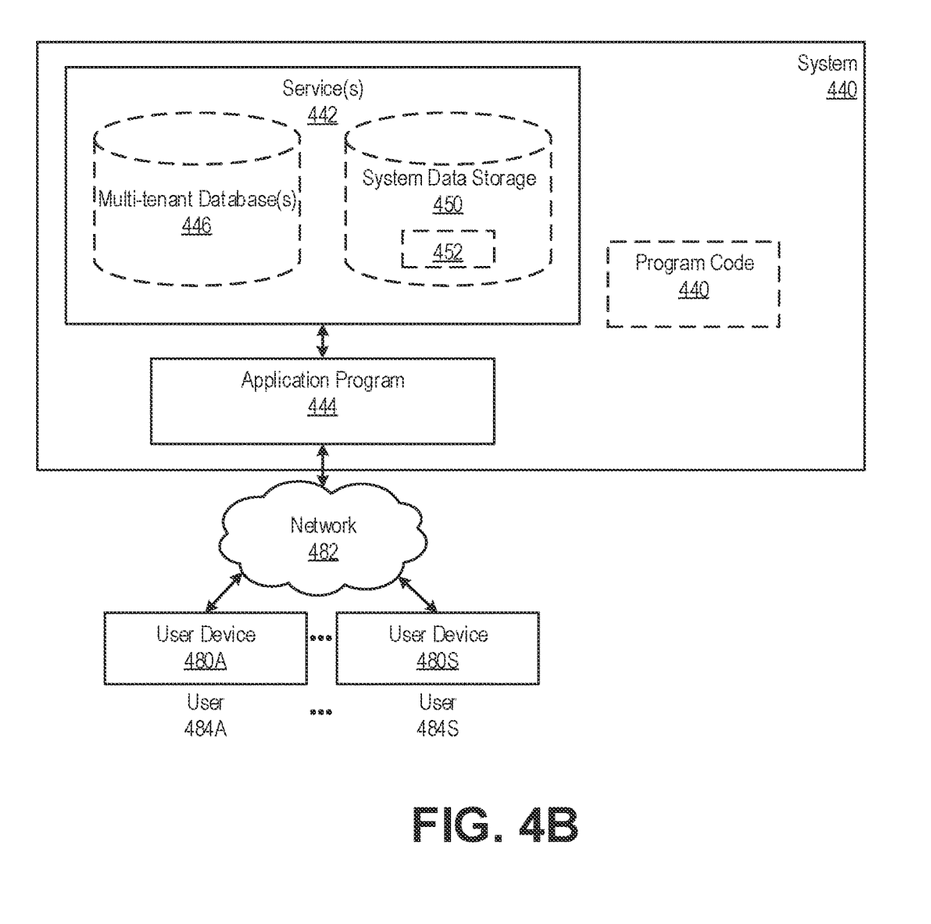
FIG. 4B is a block diagram of a deployment environment according to some example implementations.

FIG. 4B is a block diagram of a deployment environment according to some example implementations. A system 440 includes hardware (e.g., a set of one or more server devices) and software to provide service(s) 442, including the system for securely executing client code in a shared infrastructure. In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services (e.g., Amazon.com, Inc. (Amazon Web Services), Google LLC (Google Cloud Platform (GCP)), Microsoft Corporation (Azure)).

The system 440 is coupled to user devices 480A-480S over a network 482. The service(s) 442 may be on-demand services that are made available to one or more of the users 484A-484S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-484S). The service(s) 442 may communicate with each other and/or with one or more of the user devices 480A-480S via one or more APIs (e.g., a REST API). In some implementations, the user devices 480A-480S are operated by users 484A-484S, and each may be operated as a client device and/or a server device. In some implementations, one or more of the user devices 480A-480S are separate ones of the electronic device 400 or include one or more features of the electronic device 400.

In some implementations, the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 440 is a multi-tenant cloud computing architecture supporting multiple services, such as one or more of the following types of services: Push upgrade system; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 440 may include an application platform 444 that enables PAAS for creating, managing, and executing one or more applications developed by the provider of the application platform 444, users accessing the system 440 via one or more of user devices 480A-480S, or third-party application developers accessing the system 440 via one or more of user devices 480A-480S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-480S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 480A-480S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the system for securely executing client code in a shared infrastructure, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user devices 480A-480S.

Each user device 480A-480S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-484S to interact with various GUI pages that may be presented to the one or more of users 484A-484S. User devices 480A-480S might communicate with system 440 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-480S might include an HTTP client, commonly referred to as a "browser," for sending and receiving HTTP messages to and from server(s) of system 440, thus allowing users 484A-484S of the user devices 480A-480S to access, process and view information, pages and applications available to it from system 440 over network 482.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method for a service provider to execute client code in a shared infrastructure, the method comprising:
    instantiating, on compute resources of a cloud platform, a container manager configured to manage containers;
    instantiating, on the compute resources, one or more routers that are configured to receive calls over a network from the service provider requesting execution of the client code;
    prior to the routers receiving any of the calls, pre-initialize, by the container manager, a plurality of containers and registering the plurality of containers in a database to indicate that the plurality of containers are available to handle execution requests;
    receiving, by a first router, a call from the service provider and processing the call by:
        selecting an available container identified in the database;
        routing the call to the selected container and indicating in the database that selected container is in-use to prevent another router from attempting to select the selected container;

responsive to the selected container processing the call, receiving a response from the selected container and returning the response to the service provider; and marking the selected container in the database for deletion; and accessing the database, by the container manager, and deleting any of the plurality of containers that are marked for deletion to prevent the containers from processing any subsequent calls.

2. The method of claim 1, wherein pre-initiating the plurality of containers further comprises both initiating and executing the plurality of containers so that the plurality of containers are ready to accept requests.

3. The method of claim 1, wherein registering the plurality of containers in a database further comprises: storing the plurality of containers in the database with a host ID, an IP address, and a status or availability flag, and setting the status flag to indicate the respective container is available.

4. The method of claim 3, wherein selecting an available first container identified in the database further comprises: searching for and fetching from the database one of the containers with the status flag indicating that the container is available.

5. The method of claim 3, wherein indicating in the database that selected container is in-use further comprises updating the status flag of the selected container as in-use with timestamp.

6. The method of claim 1, wherein marking the selected container in the database for deletion further comprises: updating the status flag of the selected container to indicate the selected container is to be deleted or terminated.

7. The method of claim 1, wherein the selected container processing the call further comprises fetching a singleton handler to check a singleton variable to determine whether the selected container should accept the request.

8. The method of claim 7, further comprising: responsive to a same request being forwarded to the selected container, the check a singleton variable indicates a duplicate request and the selected container returns an error.

9. An apparatus comprising:
a processor;
a non-transitory machine-readable storage medium that provides instructions that, if executed by the processor, are configurable to cause the apparatus to perform operations comprising, instantiate a container manager configured to:
pre-initialize a plurality of containers;
register the plurality of containers in a container database and set a status of the plurality of containers as available;
delete any of the plurality of containers that are marked for deletion to prevent the containers marked for deletion from processing any subsequent calls;
instantiate one or more routers that are configured to:
receive over a network a call requesting execution of client code;
process the call by selecting one of the containers marked as available in the container database, and update the status of the selected container as in-use with timestamp to ensure that another one of the routers does not select any of the containers that are marked in-use;
responsive to the selected container processing the call and executing the client code, receiving a response from the selected container and returning the response to a caller; and
marking the selected container for deletion in the container database.

10. The apparatus of claim 9, wherein the container manager is further configured to: pre-initialize both sandbox or test type containers, and production type containers.

11. The apparatus of claim 9, wherein responsive to the update to the status of the selected container in the container database resulting in an error, the one or more routers are further configured to select another available container, and to continue to select another available router until either a timeout limit is reached or the writing updating the status of the selected container in the container database returns a success.

12. The apparatus of claim 9, wherein selecting one of the containers marked as available to process the call comprises fetching a singleton handler to check a singleton variable to determine whether the selected container should accept the request.

13. The apparatus of claim 12, further comprising: responsive to a same request being forwarded to the selected container, the check a singleton variable indicates a duplicate request and the selected container returns an error.

14. A non-transitory machine-readable storage medium that provides instructions that, if executed by compute resources of a cloud platform, are configurable to cause said compute resources to perform operations comprising:
instantiating a container manager configured to manage containers;
instantiating one or more routers that are configured to receive calls over a network from the service provider requesting execution of the client code;
prior to the routers receiving any of the calls, pre-initiating, by the container manager, a plurality of containers and registering the plurality of containers in a database to indicate that the plurality of containers are available to handle execution requests;
receiving, by a first router, a call from the service provider and processing the call by:
selecting an available container identified in the database;
routing the call to the selected container and indicating in the database that selected container is in-use to prevent another router from attempting to select the selected container;
responsive to the selected container processing the call, receiving a response from the selected container and returning the response to the service provider; and
marking the selected container in the database for deletion; and
accessing the database, by the container manager, and deleting any of the plurality of containers that are marked for deletion to prevent the containers from processing any subsequent calls.

15. The non-transitory machine-readable storage medium of claim 14, wherein pre-initiating the plurality of containers further comprises both initiating and executing the plurality of containers so that the plurality of containers are ready to accept requests.

16. The non-transitory machine-readable storage medium of claim 14, wherein registering the plurality of containers in a database further comprises: storing the plurality of containers in the database with a host ID, an IP address, and a status or availability flag, and setting the status flag to indicate the respective container is available.

17. The non-transitory machine-readable storage medium of claim 16, wherein selecting an available first container identified in the database further comprises: searching for and fetching from the database one of the containers with the status flag indicating that the container is available.

18. The non-transitory machine-readable storage medium of claim 16, wherein indicating in the database that selected container is in-use further comprises updating the status flag of the selected container as in-use with timestamp.

19. The non-transitory machine-readable storage medium of claim 14, wherein the selected container processing the call further comprises fetching a singleton handler to check a singleton variable to determine whether the selected container should accept the request.

20. The non-transitory machine-readable storage medium of claim 19, further comprising: responsive to a same request being forwarded to the selected container, the check a singleton variable indicates a duplicate request and the selected container returns an error.

* * * * *